Nov. 10, 1964 H. T. MANN 3,156,902

SUPERCONDUCTIVE INFORMATION HANDLING APPARATUS

Filed July 11, 1960 3 Sheets-Sheet 1

HORACE T. MANN
*INVENTOR.*

BY Jerry A. Dinardo
AGENT

Albert Rosen
ATTORNEY

SUPERCONDUCTIVE INFORMATION HANDLING APPARATUS

Filed July 11, 1960

HORACE T. MANN
*INVENTOR*

BY Jerry A. Dinardo
AGENT

Albert Rosen
ATTORNEY

SUPERCONDUCTIVE INFORMATION HANDLING APPARATUS

Filed July 11, 1960 3 Sheets-Sheet 3

HORACE T. MANN
*INVENTOR.*

*BY* Jerry G. Disando
AGENT
Albert Rosen
ATTORNEY

United States Patent Office 3,156,902
Patented Nov. 10, 1964

3,156,902
SUPERCONDUCTIVE INFORMATION HANDLING APPARATUS

Horace T. Mann, Palos Verdes, Calif., assignor to Space Technology Laboratories, Inc., Los Angeles, Calif., a corporation of Delaware Filed July 11, 1960, Ser. No. 41,862
10 Claims. (Cl. 340—173.1)

This invention relates to information handling arrangements, and has especial utility in the art of information storage arrangements utilizing superconductive elements.

It is known that many materials lose all apparent electrical resistance when they are subjected to low temperatures in the vicinity of absolute zero. A material exhibiting this characteristic property is called a superconductor and the related phenomenon is termed superconductivity. The transition from the resistive state to the superconducting state occurs abruptly at a critical temperature known as the transition temperature, a particular temperature differing for each material. It is also known that a transition from a superconducting to a resistive state can be induced in a superconductor by applying a magnetic field to the superconductor. The magnetic field can be applied externally to the superconductor or it can be induced internally by the flow of electric current through the superconductor. In the presence of an external magnetic field, a superconductor requires less directly applied current, termed the critical current, to cause a transition than it does when there is no external magnetic field present.

The ability of a superconductor to change its state between the superconducting and the normal, or resistive states, has been utilized in various superconductive computer arrangements, such as bistable logical and memory devices, to perform many of the computer functions which until recently were carried out exclusively by more bulky and complicated nonsuperconducting circuit components. However, prior art superconductive bistable devices lack one or more of the following desirable features: (1) that both the logical and memory devices be capable of operating from the same current pulse source, (2) that the logical and memory devices be capable of operating from a source whose output has a single polarity, (3) that stored information be capable of easy erasure.

It is therefore an object of this invention to provide a novel superconductive bistable apparatus that can function both as a logical device and as a memory device, and that is capable of operating from a single current pulse source whose pulses are of one polarity.

A further object is to provide an improved bistable apparatus capable of readily storing, modifying and erasing digital information.

The foregoing and other objects are realized according to the invention in an information handling apparatus comprising two superconductive circuit loops connected in electrical parallel across a pair of junction points. Each loop includes a superconductive switch portion that is capable of being transformed between a superconducting and a normal or resistive state, and a superconducting inductance portion. Means are provided for inducing persistent circulating currents selectively in each of the circuit loops. The current inducing means includes a superconductive switch element connected in series with each of the inductance portions, a pair of terminals, and a superconductive switch element connected between each of the junction points and each of the terminals.

In operation, a current pulse is applied to the terminals from a first pulse source. By energizing certain ones of the switch elements from a second pulse source, the current pulse is conducted to a first selected one of the circuit loops and is blocked from the other circuit loop, so as to induce a circulating persistent current in the first selected circuit loop. The presence of a circulating current in the first selected circuit loop and the absence of a circulating current in the other circuit loop is indicative of one of two stable states of the apparatus.

By energizing the other switch elements not previously energized and applying a new current pulse to the terminals, the new current pulse is conducted to the other or second selected circuit loop, the previously induced circulating current is destroyed, and a new persistent circulating current is induced in the second selected circuit loop. The conditions, now existing, of a circulating current present in the second selected circuit loop and the absence of current in the first selected circuit loop, are indicative of the other stable state of the apparatus.

The invention will be described in greater detail by reference to the accompanying three sheets of drawings, wherein like reference characters refer to like parts and wherein.

Since the arrangement of the invention is predicated upon certain effects peculiar to the phenomena of superconductivity; these effects will be discussed prior to a discussion of embodiments of the invention.

As has been indicated above, at temperatures near absolute zero some materials apparently lose all resistance to the flow of electrical current and become what appear to be perfect conductors of electricity, or superconductors; the temperature at which the change occurs, from a normally resistive state to the superconductove state, is called the transition temperature. Many elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material may be in an electrically resistive state even though the temperature of the material is lower than the normal superconductive-to-resistive transition temperature. The action of a current in lowering the temperature at which the transition occurs (from a state of normal electrical resistivity to one of superconductivity) is similar to the lowering of the transition temperature by an external magnetic field, inasmuch as the flow of current itself induces a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

Figure 1:
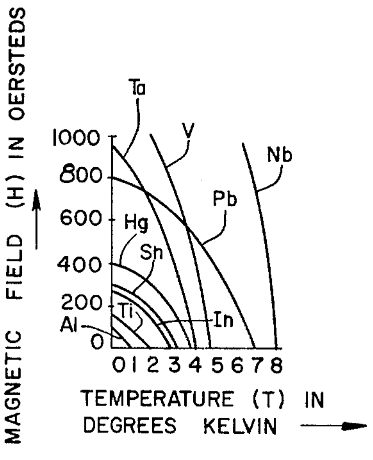
FIG. 1 is a graph illustrating the variation in transition temperatures for various materials as a function of the magnetic field to which they are subjected.

FIG. 1 illustrates the variation in transition temperatures (T) for several materials as a function of an applied magnetic field. In the absence of a magnetic field, the point at which each of the several curves intercepts the abscissa is the transition temperature at which the material becomes superconductive. (The transition temperature for each material varies almost parabolically with the magnetic field applied to it, as expressed by the function $$\frac{H_c}{H_0}=1-\left(\frac{T}{T_c}\right)^2$$

where $H_c$ is the critical magnetic field density for effecting a transition from the superconductive to the resistive state at any given temperature T, $H_0$ is the intercept of a curve on the ordinate axis, at zero degrees Kelvin, and $T_c$ is the transition temperature of the material in the absence of a magnetic field.) The transition temperature is given in degrees Kelvin. A particular material is superconductive for values of temperature and magnetic field falling beneath each of the several curves, while for values of temperature and magnetic field falling above a curve, the material possesses electrical resistance.

Since a current flowing in the material has an effect upon the transition temperature that is similar to the effect of a magnetic field, the passage of a current through superconductive materials will yield curves similar to those shown in FIG. 1.

Figure 2:
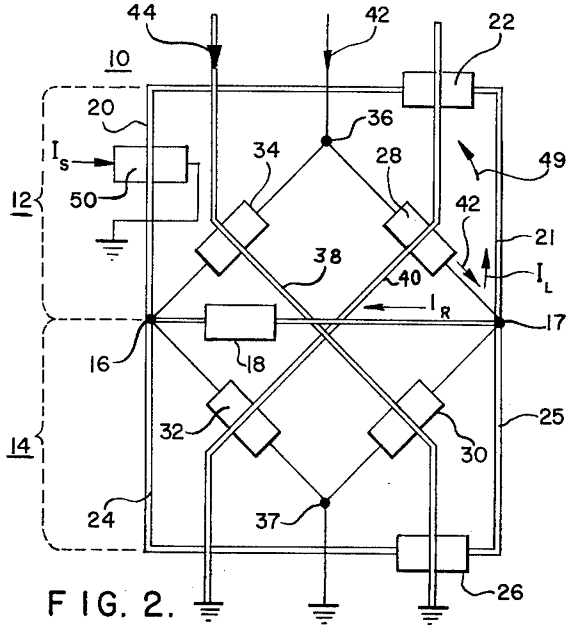
FIG. 2 is a schematic circuit of one form of bistable apparatus according to the invention, illustrated as a memory device, and showing one mode of operation thereof.

FIG. 2 illustrates schematically an embodiment of one form of superconductive bistable apparatus 10 according to the invention. This embodiment of the apparatus 10 comprises two information storage loops and an associated selection circuit, preferably in the form of thin films. The information storage loops comprise a first superconductive circuit loop 12 and a second superconductive circuit loop 14 connected in electrical parallel across a pair of junction points 16 and 17. A superconductive switch portion 18 is connected in a branch that is common to each of the circuit loops 12 and 14. Consequently, this switch portion 18 forms part of the electrical circuit of each of the loops 12 and 14. The switch portion 18 is capable of being changed from the superconducting to the normal or resistive state by a current flow through it that is in excess of the critical current of this switch portion 18.

The first superconductive loop 12 includes a pair of superconductor lines or superconductors 20 and 21 serially connected with a switch element 22 in the circuit across the switch portion 18. The superconductors 20 and 21 (and the switch element 22) together form a generally U-shaped inductance branch of the loop 12 that has a substantially higher inductance than that of the branch including the switch portion 18 (the straight line branch that interconnects the legs of the U-shaped inductance branch). This relationship is easily achieved by making the U-shaped branch including the superconductors 20 and 21 extend over a longer physical path relative to the straight line branch that includes the switch portion 18. The switch portion 18 and the switch element 22 are each made of a superconductive material having a relatively low transition temperature, such as tin or indium, so that they may be readily transformed in state by the application of relatively low currents and magnetic fields. The remainder of the first circuit loop 12 is made of a material having a relatively high transition temperature, such as lead or niobium, so that it will remain superconducting under conditions of high current flow or high applied magnetic fields. Alternatively, the different parts of the first circuit loop 12 may be made of the same material but with the parts suitably dimensioned in thickness and in width to achieve the necessary critical current and magnetic field characteristics.

The second superconductive circuit loop 14 is similar in structure and function to that of the first circuit loop 12. Thus, the second loop 14 includes, in addition to the common switch portion 18, a pair of superconductors 24 and 25 and a switch element 26 serially connected across the switch portion 18. The pair of superconductors 24 and 25 are designed to remain superconducting in the presence of relatively high currents and high magnetic fields, whereas the switch element 26 is designed to transform from its superconducting to resistive state under relatively low current and magnetic field.

The selecting circuit, for selection of the desired storage loop, comprises a number of superconductive gate elements 28, 30, 32, and 34. Each gate element 28, 30, 32, and 34 is connected between one of the storage loop junction points 16 and 17 and one of a pair of selection circuit terminals 36 and 37. In the embodiment shown, for example, a first gate element 28 is connected between the second storage loop junction point 17 and the first selection circuit terminal 36, a second gate element 30 is connected between the second storage loop junction point 17 and the second selection circuit terminal 37, a third gate element 32 is connected between the first junction point 16 and the second terminal 37, and the fourth gate element 34 is connected between the first junction point 16 and the first terminal 36. The gate elements 28, 30, 32, and 34 are designed to be transformed from the superconducting to the resistive state by a relatively low magnetic field, and are interconnected by superconductors that will remain superconducting under relatively high magentic fields.

The remainder of the selecting circuit comprises a first control superconductor 38 magnetically coupled to two opposing ones of the gate elements 30 and 34 and the switch element 26 of the second superconductor circuit loop 14, and a second control superconductor 40 magnetically coupled to the other two opposing gate elements 28 and 32 and the switch element 22 of the first superconductive circuit loop 12.

According to one mode of operating the bistable apparatus 10, an input current pulse is applied to the terminals 36 and 37 of the selecting circuit. For convenience, the input current pulse is designated by an arrow 42 entering at one terminal 36, with the return path being provided by a ground connection to the other terminal 37. Concurrently with the input current pulse 42, a gating current pulse, designated by an arrow 44, is applied to the first control superconductor 38. The gating pulse 44 creates a magnetic field about the control superconductor 38, and the magnetic field is impressed on each of the first pair of opposing gate elements 30 and 34 and on the switch element 26. The magnitude of the gating pulse 44 is sufficient to cause the gate elements 30 and 34 and switch element 26 to be transformed from the superconducting to the resistive state by the resulting magnetic field.

Consequently, the input current pulse 42 follows a path to the junction point 17, and from there splits into two paths, one path through the switch element 22 and superconductors 21 and 20, and another path through the switch portion 18. The input pulse 42 is blocked from all other paths by the resistance of the transformed elements 30, 34, and 26. Thus the input pulse 42 is selectively applied to the first circuit loop 12 and is blocked from the second circuit loop 14.

Figure 3:
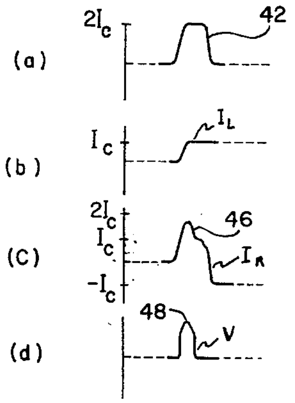
FIG. 3 is a graph of wave forms useful in explaining the operation of the bistable apparatus of FIG. 2.

FIG. 3 is a set of graphs illustrating the relationship between various current and voltage waves appearing in the first superconductive circuit loop 12. Line (*a*) represents the current applied to the first circuit loop 12; line (*b*) represents the current ($I_L$) in the superconductors 20 and 21; line (*c*) represents the current ($I_R$) in the switch portion 18; and line (*d*) represents the output voltage (V) appearing acros the junction points 16 and 17.

Referring to FIG. 3, assume that an input current pulse 42 of approximately twice the value of the critical current ($I_c$) of the switch portion 18 is applied to the first circuit loop 12. When the input pulse 42 is first applied to the circuit loop 12, the current divides between the superconductors 20 and 21 and the switch portion 18 in the inverse ratio of their impedances. That is, in the transient period immediately after the application of the input pulse 42 to the circuit loop 12, the amount of current flowing through the superconductors 20 and 21 and the switch portion 18 is inversely proportional to the inductive reactances of the superconductors 20 and 21 and the switch portion 18. This means that at first practically all of the current passes through the switch portion 18, since it has a minimum amount of inductive reactance. Thus, as shown in FIG. 3, a momentary surge of current 46 passes through the switch portion 18. Since the surge of current 46 is in excess of the critical current ($I_c$) for the switch portion 18, the switch portion 18 ceases being superconducting and presents an electrical resistance to the flow of the current, with a voltage drop being developed across the switch portion 18 in a conventional fashion. Accordingly, in FIG. 3, the voltage (V) appearing across the switch portion 18 is shown as a voltage pulse 48 corresponding to the surge of current 46 through the switch portion 18.

The appearance of an electrical resistance across the switch portion 18 causes the amount of current flowing through the superconductors 20 and 21 to increase and the amount of current flowing through the switch portion 18 to decrease, until the current flowing through the switch portion 18 drops to a value equal to that of the critical current ($I_c$) of the switch portion 18. Accordingly, the switch portion 18 becomes superconducting and the voltage disappears from the switch portion 18. Where the amplitude of the current pulse 42 is approximately two times the critical current value of the switch portion 18, the current divides between the superconductors 20 and 21 and the switch portion 18 as shown on lines (*b*) and (*c*) of FIG. 3.

When the input current pulse 42 drops to zero, the current through the superconductors 20 and 21 continues due to the action of the inductance of the superconductors 20 and 21 in resisting any change in the current flow. However, since the switch portion 18 has no appreciable inductance and is superconducting, the current flow through the switch portion 18 reverses and becomes essentially $-I_c$. Since both the superconductors 20 and 21 and switch portion 18 are superconducting for values of current flow less than the critical current ($I_c$) of the switch portion 18, the current flows from the superconductors 20 and 21 around the circuit loop 12 through the switch portion 18 and back through the superconductors 20 and 21 as a persistent circulating current which continues to circulate indefinitely so long as both the superconductors 20 and 21 and the switch portion 18 are superconducting. In FIG. 2 the persistent circulating current of the first circuit loop 12 is indicated by the arrow 49. Thus, a persistent circulating current 49 having a magnitude equal to the critical current ($I_c$) of the switch portion 18 is induced to flow in a counterclockwise direction in the first circuit loop 12 as a result of the application of an input current pulse 42 that is twice the magnitude of the critical current ($I_c$) of the switch portion 18. The presence of persistent circulating current 49 in the first circuit loop 12, and the absence of current flow in the second circuit loop 14, represents one stable state of the bistable apparatus 10.

In order to sense the presence of circulating current in the first circuit loop 12, a superconductive sensing element 50 may be mounted adjacent to one of the superconductors, for example superconductor indicated by numeral 20. The sensing element 50 is designed to be transformed to the resistive state when acted upon by the magnetic field resulting from the flow of a persistent circulating current 49 in the first circuit loop 12. A sensing current $I_s$ may be applied to the sensing element 50. If a voltage drop occurs across the sensing element 50, it indicates that the sensing element 50 has been made resistive by the persistent circulating current 49. If no voltage drop occurs across the sensing element 50, it indicates an absence of persistent circulating current 49.

Figure 4:
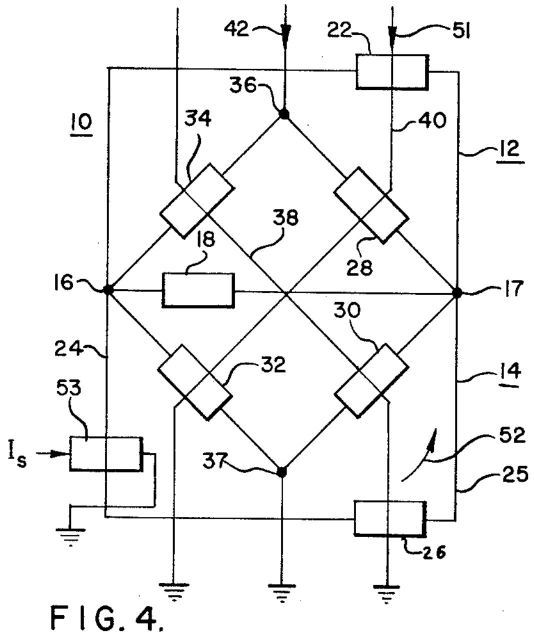
FIG. 4 is a schematic circuit showing another mode of operation of the bistable apparatus of the invention.

The bistable apparatus 10 can also be caused to assume another stable state, namely a state in which a persistent current is stored in the second circuit loop 14 and no current flows in the first circuit loop 12. Referring to FIG. 4, instead of a gating pulse 44 applied to the first control superconductor 38, a gating pulse 51 is initially applied to the second control superconductor 40. The resulting magnetic field surrounding the second control superconductor 40 transforms the switch and gate elements 22, 28, and 32, thereby blocking the input current pulse 42 from the first circuit loop 12 and conducting it instead to the second circuit loop 14 at the junction point 16. From the symmetry of the circuit arrangement illustrated in FIGS. 3 and 4, it can be seen that a persistent circulating current will be induced in the second circuit loop 14. In FIG. 4, the persistent circulating current of the second circuit loop 14 is indicated by the arrow 52 pointing in a counterclockwise direction. The presence of the persistent circulating current 52 may be sensed by a superconductive sensing element 53 placed adjacent to one of the superconductors, for example superconductor 24, a sensing current $I_s$ being applied to indicate the state of the sensing element 53.

The effect of shifting gating pulses from the first control superconductor 38 to the second control superconductor 40 is to reverse the polarity of the input pulse 42 applied to the parallel connected circuit loops 12 and 14, since the input pulse 42 is now applied to the junction point 16, whereas formerly it was applied to the junction point 17. By reason of this, the bistable apparatus 10 can be operated from a single input current pulse source whose pulses are of one polarity.

There will now be described a means whereby the condition of the bistable apparatus 10 may be altered from one stable state to a different stable state. For this purpose, referring to FIG. 5, it will be assumed that a circulating current 49 is present in the first loop 12. An input current pulse 42 is applied across the terminals 36 and 37 and a gating pulse 51 is applied to the second control superconductor 40. The gating pulse 51 induces a magnetic field about the second control superconductor 40, thereby causing the switch element 22 and gate elements 28 and 32 to transform to the resistive state. Consequently, the input current pulse 42 is conducted through the superconducting gate element 34 to the junction point 16, where it is applied to the second superconductive circuit loop 14. Simultaneously, the current previously stored in the first circuit loop 12 is blocked in that loop 12 and is forced to flow in the second loop 14.

Figure 5:
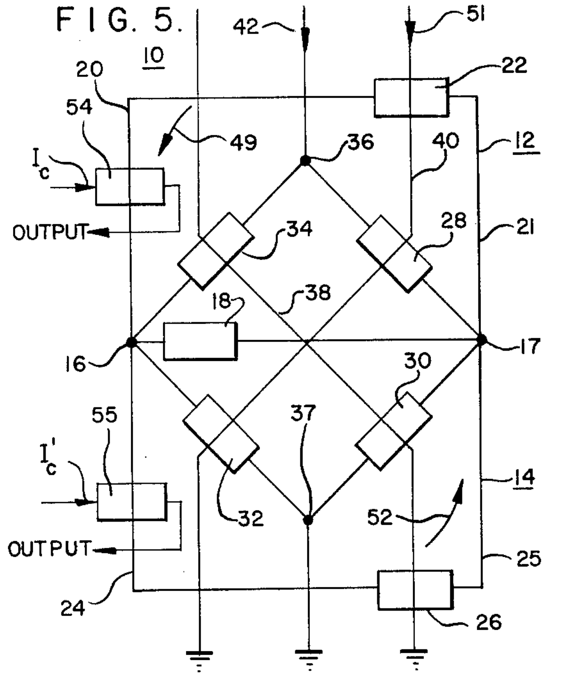
FIG. 5 is a schematic circuit showing means for altering the state of the bistable apparatus of the invention.

The input current pulse 42 divides initially in the second circuit loop 14 according to the inverse ratio of the inductances of the switch portion 18 and the superconductors 24 and 25. Hence, substantially all of the current flows through the switch portion 18. When the current pulse has a magnitude ($2 I_C$) equal to twice the critical current of the switch portion 18, and the circulating current previously stored in the first circuit loop 12 has a magnitude $I_c$ equal to the critical current of the switch portion, the total current through the switch portion 18 has an initial magnitude of $3 I_c$, the currents being additive. This magnitude of current is sufficient to cause the switch portion 18 to transform to the resistive state. When the switch portion 18 goes resistive, the current decays in the switch portion 18 and builds up in the superconductors 24 and 25, in a manner similar to that described in detail in connection with the operation of the circuit of FIG. 3. The build-up is opposed in the superconductors 24 and 25 by the circulating current 49, and the decaying current in the switch portion 18 is aided by the circulating current 49. When the total current in the switch portion 18 has decayed to a value ($I_c$) equal to the critical current of the switch portion 18, the switch portion 18 goes superconducting. At this time, the current in the superconductors 24 and 25 reaches a value of $I_c$. If the input current pulse 42 is now terminated, current continues to flow in the same direction in the superconductors 24 and 25 but reverse direction in the switch portion 18, the end result being that a new persistent circulating current of value $I_c$ flows in the second circuit loop 14 in a counterclockwise direction. The new circulating current is indicated in FIG. 5 by the arrow 52.

In a similar manner, the bistable apparatus 10 may be caused to revert to its previous state by the removal of the gating current pulse 51 from the second superconductor 40 and by the concurrent application of the gating pulse 44 to the first superconductor 38 (FIG. 2) and the input current pulse 42 to the terminals 36 and 37.

It is now apparent that the bistable apparatus 10 is capable of assuming or changing to either one of two stable states, each represented by the presence of a stored current in a respective one of the circuit loops 12 and 14. The stored current may be detected, as by noting the occurrence of a voltage drop across a sensing element in the manner previously described. When operated in this manner, the bistable apparatus 10 functions as a memory device. Alternatively, the stored current can be used to control the application of signal information to external circuits, which may include circuits such as the bistable apparatus 10 of the invention. When operated in this manner, the bistable apparatus 10 functions as a flip-flop. For example, output gate elements 54 and 55 may be placed in the first and second circuit loops 12 and 14, respectively, to control the flow of currents $I_c$ and $I_c'$ which are in turn used to gate the flow of gating pulses for succeeding stages of bistable apparatus. Inasmuch as the bistable apparatus 10 is identical in structure, except for the output circuitry, when used as a memory device or as a flip-flop, it can be appreciated that memory devices and flip-flops may be served by common pulse sources.

Figures 6, 8:
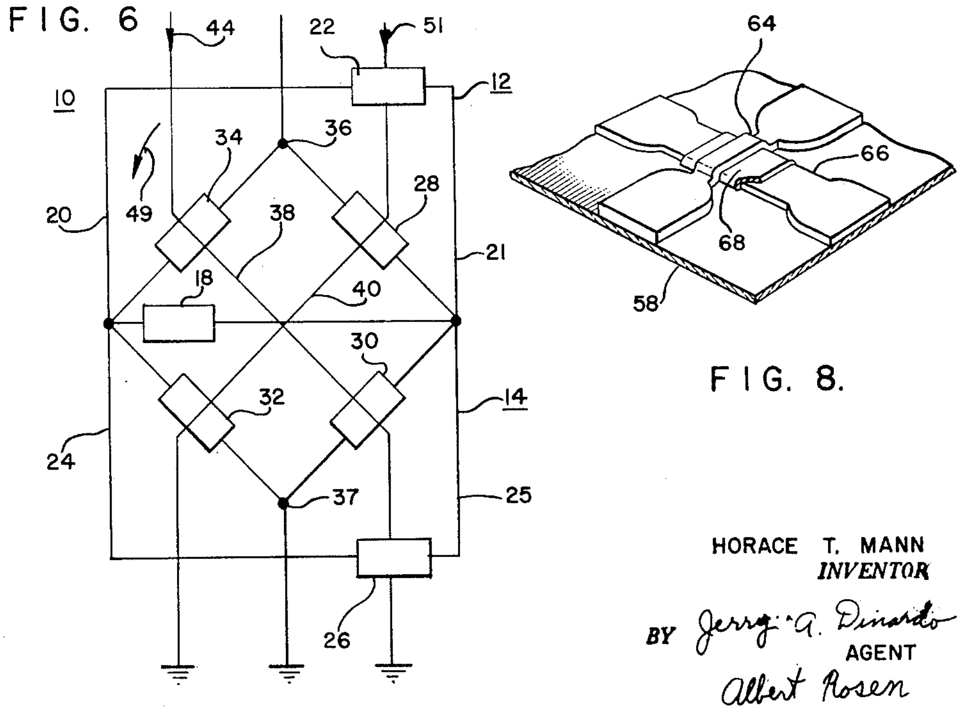
FIG. 6 is a schematic circuit showing means for erasing information stored in the bistable apparatus of the invention.
FIG. 8 is a perspective view showing the construction of a gating device useful in the bistable apparatus of the invention.

There will now be described a procedure for erasing a circulating current that is stored in one of the circuit loops 12 and 14. Referring to FIG. 6, assume that a circulating current 49 is stored in the first circuit loop 12. If gating current pulses 44 and 51 are concurrently applied to the control superconductors 38 and 40, respectively, and no input current pulse 42 is applied, the switch elements 26 and 22 and gate elements 30, 34, 28 and 32 will go resistive. Since the stored current 49 is unable to find a superconducting path, it will dissipate by resistive heating in the transformed elements and thus will be erased.

A gating current pulse 44 applied only to the first control superconductors 38 will not affect the condition of the first circuit loop 12 and thus will have no effect on the circulating current 49.

Figure 7:
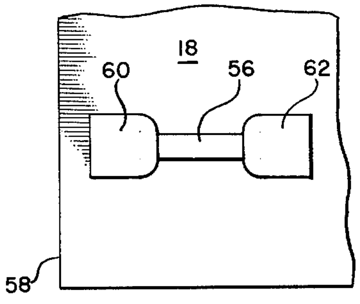
FIG. 7 is a plan view showing the construction of a switching portion useful in the bistable apparatus of the invention.

A gating current pulse 51 applied to the second control superconductor 40 only, however, will cause the switch element 22, and gate elements 28 and 32 to go resistive, thereby interrupting the further flow of current in the first circuit loop 12. Some of the current will be dissipated in the form of resistive heating. The remainder of the current will find a closed superconducting path in the second circuit loop 14. Since the current will encounter a lower impedance path through the switch portion 18 than through the superconductors 24 and 25, it will circulate in a clockwise directed path within the loop 14. When the gating pulse 51 is terminated, current will continue to flow in the second circuit loop 14, in the absence of any force which would cause the current to divert from its preivously established path. If the resulting circulating current in the second circuit loop 14 is of appreciable magnitude, it can be used to represent still another stable state of the apparatus 10. If the magnitude of the current is relatively insignificant as compared to the previously stored current, it may serve to indicate erasure of the stored current. While the superconductors and elements making up the bistable apparatus 10 may take the form of wires, they are preferably made in the form of thin superconductive films, for example, by vapor depositing them on an insulating substrate in vacuum. FIG. 7 illustrates the construction of a thin film superconductive element, such as the switching portion 18. The switching portion 18 may comprise an elongated superconductive member 56 in the form of a vacuum deposited metallic film of generally rectangular shape mounted on a polished glass or quartz substrate 58. The member 56 may be formed of indium, tin, or other superconductive material having a relatively low transistion temperature. Typical dimensions for the member are 1 millimeter in width, .1 micron in thickness, and 7 millimeters in length.

The member 56 to be capable of controlled switching between states is disposed between two thin film superconductors 60 and 62 made of a different superconductive material, such as lead or niobium, that has a higher transistion temperature than the material of the member 56. In addition, the superconductors 60 and 62 may have greater width and thickness dimensions than the member 56 to assure that they will remain superconducting under current flow sufficient to transform the member 56 to be switched.

FIG. 8 illustrates the construction of a typical superconductive gating device. Such a construction may be used for the gate elements 28, 30, 32, and 34, the switch elements 22 and 26, the sensing elements 50 and 53, and the output gate elements 54 and 55. The gating device comprises an elongated thin film superconductive switching or control element 64 disposed on an insulating substrate 58. Adjacent to the control element 64 and extending in directions transverse of the element 64 is mounted an elongated thin film superconductive gate element 66. The two elements 64 and 66 are separated and insulated from each other by a film 68 of insulating material, such as silicon monoxide, or of a polymerized in situ organic silicone material such as a polydimethylsiloxane. (Such a polymerized in situ insulating film may, for example, be made by subjecting the element to be covered with insulation to electron bombardment in an environment of a silicone oil vapor, the electron beam creating a solid polymer film on the element.) The silicon monoxide insulation film should be at least about 1000 angstrom units in thickness in order to avoid pinholing, while the polymerized in situ film should be at least about of the order of 50 angstrom units in thickness for the same purpose. The superconductive gate element 66, when made of vacuum deposited tin or indium, is preferably thinner than of the order of 2500 angstrom units in thickness in order that it may exhibit the desired switching characteristics. The control element 64 is made of a material having a much higher transition temperature than the material of the gate element 66. Suitable materials for the control element 64 are lead or niobium, while the gate element 66 may comprise tin or indium. The width of the control element 64 is preferably made smaller than the width of the gate element 66 in order to optimize the gains. Thus a relatively small current applied to the control element 64 will generate a magnetic field of suffiicent intensity to transform local regions of the gate element 66 and thereby block the flow of a relatively large current through the gate element 66.

Figure 9:
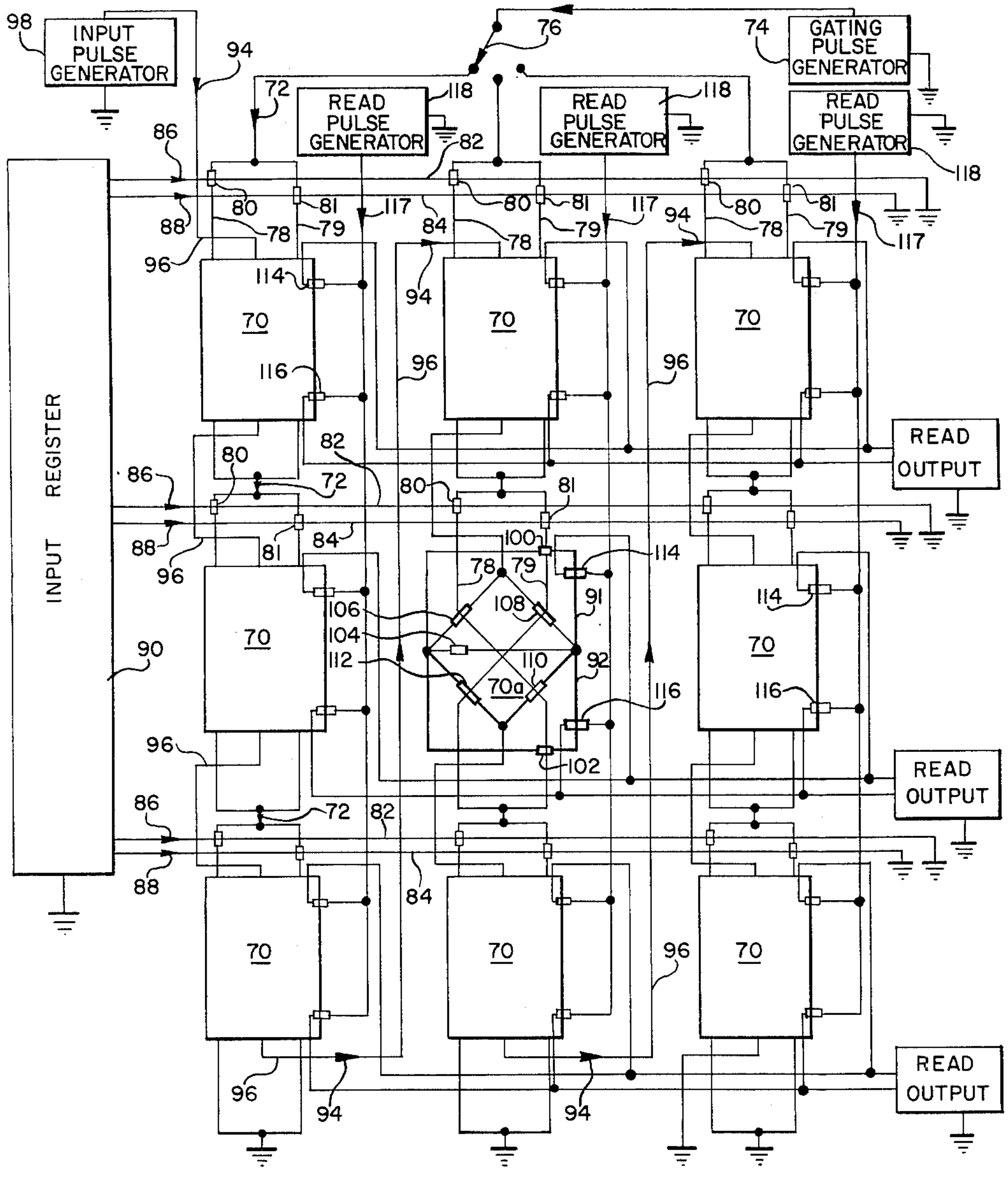
FIG. 9 is a schematic circuit showing a memory array of bistable devices according to the invention.

FIG. 9 illustrates schematically a plurality of bistable devices 70, each similar to the apparatus 10 described above, arranged in a memory type array. In the example shown, a total of nine devices 70 are arrayed in three columns and three rows. However, the number of devices can be increased to accommodate more information. For simplicity, only one of the devices 70 (device 70*a*) is shown in detail, the remaining devices 70 being illustrated in block form.

Gating current pulses 72 are fed to each column of the array from a gating pulse generator 74, a particular pulse 72 arriving at a selected column through a selector switch 76. Each bistable device 70 includes a pair of parallel connected control superconductors 78 and 79, with all of the superconductor pairs connected in series in each column. A pulse arriving at a column is caused to flow through either one or the other control superconductor 78 or 79, depending upon which one of two gate elements 80 or 81 (one in each control superconductor 78 and 79), are energized. The gate elements 80 and 81 receive their energizing fields through pairs of row selector superconductors 82 and 84, each pair being associated with a respective row of bistable devices 70. The row selector superconductors 82 and 84 are preferably arranged to receive write pulses 86 or 88 from an input register 90 so that all of the selector superconductors 82 or 84, one from each pair, receive their write pulses 86 or 88 simultaneously.

In operation, write pulse 86 or 88 applied to one of the selector superconductors 82 or 84, respectively, will transform the gate element 80 or 81 coupled thereto, thereby blocking the gating pulse 72 from the control superconductor 78 or 79 in which the transformed gate element 80 or 81 lies. Thus the gating pulse 72 is forced through the other control superconductor 78 or 79, thereby selecting one of the two circuit loops of each bistable device 70. In the bistable device 70*a* shown, in detail, for example, the first circuit loop 91 is selected when the gating pulse 72 is forced through the control superconductor 78, and the second circuit loop 92 is selected when the gating pulse 72 is forced through the other control superconductor 79. Simultaneously with the gating pulse 72, an input pulse 94 is applied to all of the bistable devices 70 through serially connected superconductors 96, the input pulse 94 being fed from an input pulse generator 98. A persistent circulating current may be stored in a manner similar to that previously described; in the bistable device 70 shown, the switch elements are designated by numerals 100 and 102, the common switch portion is designated 104 and the gate elements are designated 106, 108, 110, and 112.

For sensing or reading out the stored information sensing devices 114 and 116 are connected in pairs and coupled to the circuit loops 91 and 92, respectively, of each of the bistable devices 70. The sensing devices 114 and 116 in each column are fed read pulses 117 in parallel from a read pulse generator 118, with the read pulse 117 being conducted through the sensing device 114 or 116 not transformed by a stored current.

It is now apparent that the improved bistable apparatus of the invention is useful both as a logical device and as a memory device, each capable of readily storing, modifying and erasing digital information, and each capable of being served by a common current pulse source of a single polarity.

What is claimed is:

1. A superconductive information handling arrangement, comprising: two superconductive circuit loops connected in electrical parallel across a pair of junction points; each of said loops including a switch portion, capable of being changed from a superconducting to a resistive state when subjected to a current flow in excess of a critical value, and a superconducting inductance portion; and means connected to induce a persistent circulating current selectively in each of said circuit loops; said means including a superconductive switch element connected in series with each of said inductance portions, a pair of terminals, and a superconductive gate element connected between each of said junction points and each of said terminals; each of said superconductive switch elements being capable of being changed between superconducting and resistive states when subjected to a first external excitation means, each of said gate elements being capable of being changed between superconducting and resistive states when subjected to a second external excitation means.

2. A superconductive information handling arrangement according to claim 1, wherein each of said circuit loops shares said switch portion in common.

3. A superconductive information handling arrangement according to claim 1; and further including means for subjecting each of said switch elements to a magnetic field of sufficient magnitude to induce a transformation in said switch element from the superconducting to the resistive state; and means for subjecting each of said gate elements to a magnetic field of sufficient magnitude to transform said gate element from the superconducting to the resistive state.

4. A superconductive information handling arrangement according to claim 1; and further including first means for subjecting one of said switch elements and a first pair of said gate elements to respective magnetic fields of sufficient magnitudes to transform said one switch element and said first pair of gate elements from the superconducting to the resistive state; and second means for subjecting the other of said switch elements and a second pair of said gate elements to respective magnetic fields of sufficient magnitudes to transform said other switch element and said second pair of gate elements from the superconducting to the resistive state.

5. A superconductive information handling arrangement, comprising: first and second superconductive circuit loops connected in parallel across a pair of junction points; each of said loops including a switch portion, capable of being changed from a superconducting to a resistive state when subjected to a current flow in excess of a critical value, and a superconducting inductance portion; a source of input current; first and second superconducting paths connected respectively between said source of input current and each of said junction points; a first gate element in said first superconducting path and selectively energizable to cause said input current to pass through said second superconducting path to one of said junction points only; a second gate element in said second superconducting path and selectively energizable to cause said input current to pass through said first superconducting path to the other of said junction points only; a first switch element in said first superconductive circuit loop and selectively energizable to block the flow of current in said first superconductive circuit loop; a second switch element in said second superconductive circuit loop and selectively energizable to block the flow of current in said second superconductive circuit loop; means for concurrently energizing said first gate element and said first switch element so as to selectively apply said input current to said second superconductive circuit loop; and means for concurrently energizing said second gate element and said second switch element so as to selectively apply said input current to said first superconductive circuit loop.

6. A superconductive information handling arrangement comprising: first and second superconductive circuit loops connected in electrical parallel across first and second junction points, each of said loops including a switch portion, capable of being changed from a superconducting to a resistive state when subjected to a current flow in excess of a critical value, and a superconducting inductance portion; and means connected to induce a persistant circulating current selectively in each of said circuit loops, said means including a first superconducting switch element connected in series with the inductance portion of said first circuit loop, a second superconducting switch element connected in series with the inductance portion of said second circuit loop, first and second terminals, a first gate element connected between said first terminal and said second junction point, a second gate element connected between said second junction point and said second terminal, a third gate element connected between said second terminal and said first junction point and a fourth gate element connected between said first junction point and said first terminal, first means connected to concurrently energize said first switch element and said first and third gate elements so that an input current applied to said first and second terminals will be received at said junction points with a first polarity, and second means connected to concurrently energize said second switch element and said second and fourth gate elements so that said input current will be received at said junction points with a second polarity that is opposite said first polarity.

7. A superconductive information handling arrangement according to claim 6, wherein said first and second means comprise a mangetic field producing means capable of inducing superconducting to resistive transitions in respective ones of said switch and gate elements.

8. A superconductive information handling arrangement according to claim 6, wherein said first and second means comprise a first and a second control superconductor magnetically coupled to said switch and gate elements, respectively.

9. A superconductive information handling arrangement according to claim 6, and further including a first superconductive sensing element coupled to said first circuit loop, and a second superconductive sensing element coupled to said second circuit loop.

10. A superconductive information handling arrangement according to claim 6, and further including a first output gate element coupling said first circuit loop to a first output circuit, and a second output gate element coupling said second circuit loop to a second output circuit.

References Cited in the file of this patent

UNITED STATES PATENTS 2,930,908 McKeon et al. ---------- Mar. 29, 1960

OTHER REFERENCES

R. Garwin: "An Analysis of the Operation of a Persistent-Superconductive Memory Cell," IBM Journal, Oct. 1957, pp. 304–308.

J. Anderson and F. Hand: "Persistent Current Ring Counter," IBM Technical Disclosure Bulletin, vol. 2, No. 2, Aug. 1959, pp. 53–54.